United States Patent [19]

Fournier et al.

[11] Patent Number: 4,485,560

[45] Date of Patent: Dec. 4, 1984

[54] METHOD AND DEVICE FOR DETERMINING THE SHAPE OF THE INNER WALL OF A TUBE

[75] Inventors: Yves Fournier, Chatenoy le Royal; Claude Rigoulot; Pierre Mainy, both of Chalon-sur-Saone, all of France

[73] Assignee: Creusot-Loire, Paris, France

[21] Appl. No.: 433,183

[22] Filed: Oct. 6, 1982

[30] Foreign Application Priority Data

Oct. 16, 1981 [FR] France ................ 81 19480

[51] Int. Cl.³ .............................................. G01B 7/28
[52] U.S. Cl. ............................ 33/178 F; 33/174 P; 33/147 K
[58] Field of Search ............ 33/178 R, 178 E, 178 F, 33/174 P, 174 Q, 174 L, 147 K

[56] References Cited

U.S. PATENT DOCUMENTS 3,750,295  8/1973  Nordmann et al. ............... 33/174 L
4,021,925  5/1977  Loftus ................................ 33/174 P
4,125,943  11/1978 Ando ............................... 33/174 L X
4,167,066  9/1979  Cooper et al. ..................... 33/174 P Primary Examiner—Harry N. Haroian
Attorney, Agent, or Firm—Pollock, Vande Sande & Priddy

[57] ABSTRACT

A device for determining the shape of the inner wall of a tube, particularly at the level of a weld. A measuring device is arranged in the tube enabling the distance separating a given point situated on the inner wall of the tube and the longitudinal axis of this tube to be read. The measuring device is movable in the tube so as to read off successive dimensions of such point in the course of its displacement, the movement of the measuring device being such that the point so measured is displaced longitudinally in an alternating movement over a constant distance, and displaced simultaneously in slow rotation around the longitudinal axis, the reading of the measurements being completed when the point measured has carried out at least one complete revolution in the tube. The invention is useful in checking the tubes of a steam generator.

5 Claims, 2 Drawing Figures

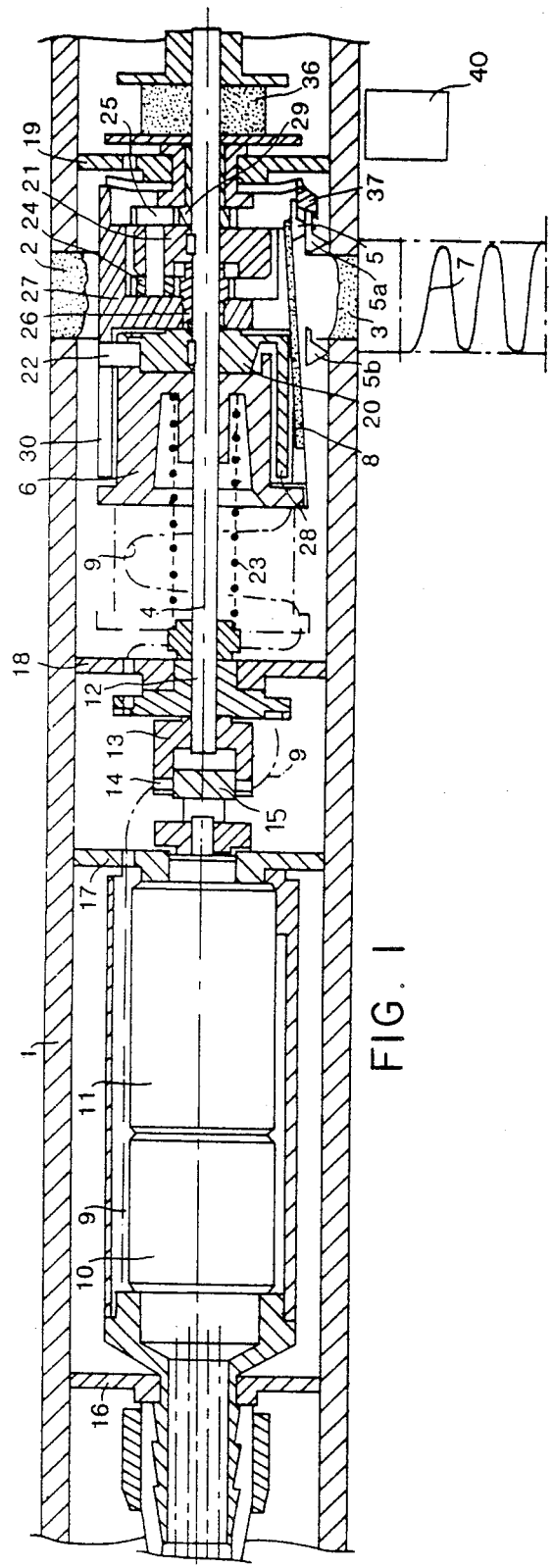

METHOD AND DEVICE FOR DETERMINING THE SHAPE OF THE INNER WALL OF A TUBE

FIELD OF THE INVENTION

The present invention relates to a device for determining the shape of the inner wall of a tube, particularly at the level of a weld.

PRIOR ART

Numerous devices exist in industry comprising tubes subject to considerable mechanical stresses. This is the case, for example, with tubes constituting the water-steam circuit of steam generators of the sodium-water type. In such steam generators, the tubes are arranged in relatively dense bundles, including numerous welds as well as various elbows, and are subject to relatively high thermal stresses. The checking of the state of the tubes, particularly at the level of the welds, may consequently be a relatively delicate operation to carry out in installations in the course of manufacture or during maintenance.

Since visual examination of the outer shape of a tube is not sufficient to be certain of the quality of the weld, it has already been proposed to carry out examinations by X-rays, but the latter only permit checking of the compactness of the weld, i.e., enable verification that the weld does not include internal fissures. By X-ray examination it is hardly possible to determine with accuracy the outer shape of the weld. In addition, it is sometimes impossible to introduce radiographic equipment, in view of its bulk, at the level of the tube to be checked when the latter is already mounted in an installation.

SUMMARY OF THE INVENTION

For these reasons, present invention involves determining the shape of the inner wall of a tube, based on the principle of direct dimensional analysis of this inner wall by means of an apparatus that can be inserted through one end of the tube and can be brought, sometimes over rather long distances, to the exact location of the portion of the tube that it is desired to check.

The determination of the shape of the inner wall of the tube must be capable of permitting, in certain cases, the determination and, if necessary, the tracing of the contour of the tube along any section established in a longitudinal or radial plane of the tube. It must be able consequently to permit the definition of all the dimensional characteristics of the tube, for example, its mean diameter, its degree of ovalization or of deformation. Successive measurements carried out according to the invention in the course of the life of the tube can give, for example, its internal wear by oxidation, its increase in size due to the fact of pressure which exists inside the tube during its use, and its deformation due to the supports.

According to the invention, provision is made for placing in the tube a measuring device enabling the distance separating a given point situated on the inner wall of the tube and the longitudinal axis of this tube to be noted, the measuring device being movable in the tube so as to note the successive measurements of said point in the course of its movement, the movement of the measuring device being such that the point so measured is moved longitudinally according to an alternating movement over a constant distance, equal to the length of the section of tube that it is desired to check, and is moved, simultaneously with this alternating movement, in slow rotation around said longitudinal axis, the reading of the measurements being completed when the point measured has effected at least one complete revolution in the tube.

According to another aspect of the invention, there is provided a device for determining the shape of the inner wall of the tube which comprises mechanical means for moving the measuring apparatus, the device being so arranged that it can be threaded and moved longitudinally inside the tube without being blocked in any curved parts which may exist.

The device for determining the shape of the inner wall of a tube comprises a motor-reducing gear unit driving a shaft in rotation on which are mounted a cam and an input pinion of a reducing gear train, a movable part bearing a measuring device for the radius of the tube at a given point, said movable part being at the same time coupled to the output pinion of the reducing gear train, in order to rotate slowly around the longitudinal axis and being in contact with the cam in order to be moved simultaneously in a longitudinal alternating movement, and also comprises a flexible rod designed to move the measurement taking apparatus longitudinally in the tube, as well as a reading apparatus for the measurements, known per se, situated outside of the tube and connected to the measuring device through an electrical connection.

The device according to the present invention can be used to determine the shape of the inner wall of a tube, not only at the level of a weld but also at any point whatever of the tube of which it is designed to determine the geometric shape, for example, in order to check that it has not been subjected to abnormal mechanical stresses or corrosion.

BRIEF DESCRIPTION OF THE DRAWINGS

Other advantages inherent in this invention will appear from the detailed description of the embodiment which follows, illustrated by the accompanying figures, given purely by way of illustration.

FIG. 1 is a longitudinal section of a measurement apparatus according to the present invention, arranged inside the tube to be checked.

FIG. 2 shows a longitudinal section of the connection between the measurement taking apparatus and the outside.

DETAILED DESCRIPTION

FIG. 1 shows generally a tube 1 in which is arranged a set of mechanisms which will be described below, this tube 1 being formed from two sections assembled end-to-end by welding. The weld bead shown here, forms a ring which makes a whole revolution of the tube and which can show certain shape irregularities. In the embodiment described here a measurement-taking apparatus is arranged inside the tube so as to analyze the shape of the inner wall of this tube at the level of the weld 2, 3. It is in this region that defects can most often occur. The weld may, for example, have a beading as shown at 2 or a concave cross-section as shown at 3. The method of determining the shape of the tube 1 consists of carrying out a large number of measurements at different points of the tube, in the region to be checked, these measurements consisting of determining the distance separating a given point of the inner wall of the tube and the axis 4. In the illustrated embodiment, the measurement of this distance is carried out by means of a feeler 5, connected to a part 6 whose axis remains co-linear whatever its movement, with a longitudinal axis for the tube. During the operation of the apparatus, the part 6 is moved longitudinally so that the feeler 5 is continually placed in contact with the inner wall of the tube 1 while moving longitudinally alternately between the end positions 5a and 5b. Simultaneously with this longitudinal alternating movement, the part 6 rotates slowly on itself around the axis 4 and hence produces an equivalent rotation of the feeler 5. For each of the to and fro movements of the feeler between positions 5a and 5b, the latter rotates through a small fraction of a revolution. In the course of operation, the feeler 5 hence affects a large number of to and fro movements between the positions 5a and 5b, affecting a complete revolution in the tube. If a developed tracing of the inner surface of the tube is made, it is possible to show, as has been done in FIG. 1, the path 7 which the feeler 5 follows over the inner surface of the tube and which can be approximately that of a sinusoidal curve of amplitude equal to the distance separating the extreme longitudinal positions 5a, 5b and of period equal to the angular displacement of the feeler when the latter has effected a longitudinal to and fro movement. The feeler 5 delivers continually a signal representing the distance which separates it from the axis 4, this signal being transmitted to the outside of the tube through a cable which extends inside the tube to re-emerge at one of its ends to be connected to a reading apparatus for the measurement given by the feeler 5. To obtain the determination of the shape of the inner wall of the tube, it is hence necessary to note the indications of distance supplied by the feeler at a multitude of points situated over the path 7 followed by this feeler, during the whole time that the feeler takes to effect a complete revolution within the tube.

In the embodiment which is shown in FIG. 1, the measurement of the distance separating the feeler from the axis 4 is effected in reality by the piezo-electric crystal plate 8 which connects the movable part 6 to the feeler 5, and which delivers, in known manner, an electrical charge proportional to the movement of its end which supports the feeler 5 with respect to the part 6. This electrical charge is transmitted to the outside through an electrical cable 9.

The mechanical device will now be described which permits the generation of the complex movement of the movable part 6 which imparts to the feeler 5 its movement along a substantially sinusoidal path 7. To this end, the device comprises a motor 10 which is coupled to a reducing gear 11 whose output shaft, which rotates sufficiently slowly, is coupled to shaft 12 through a conventional cardan joint 13, 14, 15. The motor-reducing gear unit 10, 11 is held rigidly, during the operation of the apparatus, both longitudinally and angularly by means of parts 16, 17, 18, 19 which form supports for the motor-reducing gear unit and for the shaft 4 and which exert within the tube sufficient friction to prevent their movement during the measurement. On the rotary shaft 12 are rigidly mounted two parts 20 and 21. The part 20, which is hence rotated, supports a cylindrical cam 28 which causes, during its rotation, the alternating longitudinal movement of the part 6 which comprises a portion which has a shape complementary with the shape of the cam 28 of the part 20. In addition, the part 21 which is rigidly mounted on the rotary shaft 12 is constituted by a satellite holder which rotates the spindles of the satellites 24 and 25. These satellites 24 and 25 are rigidly connected in rotation. The satellite 25 is in engagement with a fixed gear wheel 29 and the satellite 24 is in engagement with a gear wheel 26 connected to a part 27. The gear wheels 29 and 26 have a slightly different number of teeth, and the epicyclic train unit 24, 25, 26 and 29 consequently operates, in known manner, as a reducing gear of which the input is constituted by the satellite holder 21 and the output, whose motion is reduced, is constituted by the gear wheel 26. Part 27 which hence rotates much more slowly than the shaft 12, comprises a longitudinal groove 30 into which a pin 22 becomes engaged which is connected to the movable part 6. The movable part 6, apart from its alternating longitudinal movement generated by the cam 28, hence rotates simultaneously at the same speed as the part 27. The feeler 5 which is connected to the part 6 consequently driven with the alternating longitudinal movement associated with the slow rotary movements, and hence follows a path which may be likened to a sinusoidal curve 7 along the inner wall of the tube, while always remaining in contact with this wall of the tube.

FIG. 2 shows an assembly of elements which permit the measurement-taking apparatus to be placed in communication with the outside. The measuring apparatus is moved inside the tube 1 by means of a flexible rod 31 whose length is preferably greater than the length of the tube. The ends of the rod 31 are respectively fixed at 33 to the outer apparatus 32 serving for the reading and interpretation of the signal, and at 34 to the measurement-taking apparatus. Over the whole length of the flexible tube 31, it is preferable to fix guide rings 35 spaced regularly. Within the flexible rod 31 is passed the electrical cable 9 coming from the piezo-electric strip 8, as well as various control and electrical energy supply cables for the motor 10.

Since it is difficult to mark the exact position of the measurement-taking apparatus when it is inserted in the tube 1, it is possible to adapt, to the end of the measurement-taking apparatus, an element fixed longitudinally with respect to the apparatus, enabling the apparatus to be located with precision by means of a suitable detector, situated close to the tube. This element may, for example, be a magnet, the detector then being a magnetic detector. This element may also be a radioactive element, the detector then being a detector of radioactivity 40.

The cardan joint 13, 14, 15 enables the jamming of the apparatus to be avoided during its threading into the tube on passing through bends.

The outer apparatus 32, serving for the reading and interpretation of the signals coming from the measurement apparatus, preferably comprises, essentially, an analog-digital convertor which converts the signal, and a computer which processes the digital values supplied by the convertor. The computer can be programmed so as to give, from these numerical values, numerical data enabling the establishment, for example, of the tracing of the contour of the inner surface of the tube, along different sections established in longitudinal planes or radial planes with respect to the tube.

The invention is not limited to the embodiment which has just been described. It is possible, for example, to conceive of other devices enabling the sinusoidal movement of the feeler to be generated; it is also possible to apply this invention to checking tubes used in various installations.

I claim:

1. In a device for determining the shape of the inner wall of a tube, particularly at the level of a weld, comprising a measurement-taking apparatus constituted by a motor-reduction gear assembly (10, 11) rotating a shaft (12), a flexible rod (31) for longitudinally displacing said measurement-taking apparatus within said tube, and an apparatus for reading the measurements connected to said measurement-taking apparatus and located outside said tube, the improvement comprising
   (a) a reducing gear train (24, 25, 26, 29) comprising an input wheel (21) rigidly attached to said shaft (12) and an output wheel (26);
   (b) a movable part (6) supporting a device for measuring the radius of said tube at a given point, said movable part also being rotatably connected to said output wheel (26) in order to turn slowly about the longitudinal axis, and in contact with a cam (28) rigidly fixed on said rod (12) so as to be displaced simultaneously in accordance with an alternating longitudinal movement.

2. The improvement according to claim 1, wherein said cam is of cylindrical shape and said reducing gear train is an epicyclic train comprising a satellite holder, two satellites connected in rotation and engaging respectively with a first pinion and a second pinion fixed in rotation and whose number of teeth is different from that of said first pinion, said input wheel of the reducing pinion being constituted by said satellite holder and said output wheel of said reducing gear train being constituted by said first pinion.

3. The improvement according to claim 1 or 2, wherein said measuring device is constituted by a feeler connected to said movable part through a piezo-electric crystal delivering an electrical charge which is sent to a readout apparatus situated outside the tube through an electrical cable.

4. The improvement according to claim 1 or 2, wherein said motor-reducing gear unit rotates said shaft through a cardan joint in order to permit the whole of the apparatus so constituted to make a longitudinal movement inside said tube without risk of jamming in the bends of said tube.

5. The improvement according to claim 1 or 2, wherein said measurement-taking apparatus further comprises a magnet enabling said measuring apparatus to be located with precision when it is inserted in said tube, localization being carried out by means of a magnetic detector arranged outside said tube.

* * * * *